(12) United States Patent
Chon et al.

(10) Patent No.: US 10,017,838 B2
(45) Date of Patent: Jul. 10, 2018

(54) METHOD FOR EXTRACTION OF LITHIUM FROM LITHIUM BEARING SOLUTION

(71) Applicant: RESEARCH INSTITUTE OF INDUSTRIAL SCIENCE & TECHNOLOGY, Pohang-si (KR)

(72) Inventors: Uong Chon, Pohang-si (KR); Ki Young Kim, Yongin-si (KR); Gi-Chun Han, Cheongju-si (KR); Chang Ho Song, Incheon (KR); Young Seok Jang, Phoang-si (KR); Kee-Uek Jeung, Pohang-si (KR); So Ra Jung, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 569 days.

(21) Appl. No.: 14/363,820

(22) PCT Filed: Dec. 10, 2012

(86) PCT No.: PCT/KR2012/010708
§ 371 (c)(1),
(2) Date: Jun. 9, 2014

(87) PCT Pub. No.: WO2013/089400
PCT Pub. Date: Jun. 20, 2013

(65) Prior Publication Data
US 2014/0348734 A1    Nov. 27, 2014

(30) Foreign Application Priority Data

Dec. 12, 2011 (KR) .................. 10-2011-0132840
Dec. 28, 2011 (KR) .................. 10-2011-0144771
Dec. 28, 2011 (KR) .................. 10-2011-0144772

(51) Int. Cl.
C22B 26/12 (2006.01)
C22B 3/44 (2006.01)

(52) U.S. Cl.
CPC ................ C22B 26/12 (2013.01); C22B 3/44 (2013.01); *Y02P 10/234* (2015.11)

(58) Field of Classification Search
None
See application file for complete search history.

(56) References Cited

U.S. PATENT DOCUMENTS 7,998,618 B2 *   8/2011   Nuspl ................ C01B 25/45
                                                    423/306
2010/0074822 A1 * 3/2010   Chung ................ B82Y 30/00
                                                    423/306

FOREIGN PATENT DOCUMENTS

CN     1618997       5/2005
CN     1878610       12/2006
(Continued)

OTHER PUBLICATIONS

Steven Tandy et al., "Lithium Production From Highly Saline Dead Sea Brines", Reviews in Chemical Engineering, Reidel, Dordrecht, NL, vol. 9, No. 3-4, Dec. 1, 1993, p. 293-317, XP008176938, ISSN: 0167-8299, DOI: 10.1515/REVCE.1993.9.3-4.293 [retrieved on May 18, 2011].

(Continued)

*Primary Examiner* — Melissa S Swain
(74) *Attorney, Agent, or Firm* — Lex IP Meister, PLLC (57) ABSTRACT

A method of extracting lithium from a lithium bearing solution and specifically, economically extracting lithium from a lithium bearing solution comprising the steps of: adding a nucleus particle to a lithium bearing solution; and precipitating the dissolved lithium in the lithium bearing solution as lithium phosphate by adding a phosphorous (Continued)

supplying material to the lithium bearing solution including the nucleus particle is provided.

12 Claims, 5 Drawing Sheets

(56) References Cited

FOREIGN PATENT DOCUMENTS

| CN | 101112979 A | * | 1/2008 |
|---|---|---|---|
| JP | 06-279883 | | 10/1994 |
| JP | 10-237419 | | 9/1998 |
| JP | 2004-142986 | | 5/2004 |
| JP | 2008-066019 | | 3/2008 |
| KR | 1020090129460 | | 12/2009 |

OTHER PUBLICATIONS

Zhang Gang, et al., "Seeding Technology on the Precipitation Crystallization Process", Chemical World, issue 6, pp. 326-328, Jun. 2002.

* cited by examiner

METHOD FOR EXTRACTION OF LITHIUM FROM LITHIUM BEARING SOLUTION

TECHNICAL FIELD

The present invention relates to a method of extracting lithium from a lithium bearing solution.

BACKGROUND ART

The application of lithium currently extends to diverse industries, including the rechargeable battery, glass, ceramic, alloy, lubricant, and pharmaceutical industries. The rechargeable lithium battery has recently been receiving attention as a main power source for hybrid and electric cars, and the market for lithium rechargeable batteries for cars is expected to continue growing to approximately one-hundred times the conventional compact battery markets for cell phones and notebooks.

In addition, a global movement towards more stringent environmental regulations is likely to expand the application of lithium to not only the hybrid and electric car industries, but to the electrical, chemical and energy fields as well. Thus, a dramatic increase of both domestic and foreign demand for lithium is expected.

The main sources for the lithium could be minerals, brine and seawater. Although minerals such as spodumene, petalite and lepidolite contain relatively large amounts of lithium, ranging from approximately 1 to 1.5%, the extraction involves complicated processes such as floatation, calcination at a high temperature, grinding, acid mixing, extraction, purification, concentration, and precipitation. These processes, require high energy consumption, are considered to be cost-ineffective, and the use of acids during the lithium extraction also causes environmental pollution.

It has been reported that approximately $2.5\ 10^{11}$ tons of lithium is dissolved in seawater. Although the majority of technologies involve inserting an extraction device containing an absorbent into the seawater in order to extract lithium by treating with acids after selectively absorbing the lithium, it is extremely inefficient and uneconomical to directly extract the lithium from seawater because the concentration of lithium contained in the seawater is limited to 0.17 ppm.

Due to the aforementioned disadvantages, lithium is currently extracted from brine produced from natural salt lakes, but salts such as Mg, Ca, B, Na, K, $SO_4$ are also dissolved in the brine.

Further, the concentration of lithium contained in the brine ranges from approximately 0.3 to 1.5 g/L, and lithium contained in the brine is usually extracted in the form of lithium carbonate having a solubility of about 13 g/L. Even assuming that lithium contained in the brine is completely converted to lithium carbonate, the concentration of lithium carbonate in the brine is limited to 1.59 to 7.95 g/L (the molecular weight of $Li_2CO_3$ is 74, and the atomic weight of Li is 7. If the concentration of lithium is multiplied by 5.3 (74 14≈3), the concentration of lithium carbonate can be estimated). Since most of the lithium carbonate concentration is lower than the solubility of lithium carbonate, the extracted lithium carbonate re-dissolves, a solid may be difficult to be separated from a liquid, and thus there is a problem of the lithium extraction yield being extremely low.

Accordingly, in order to extract lithium carbonate from lithium contained in brine, the brine pumped from the natural salt lake was stored in evaporation ponds and subsequently naturally evaporated outdoors over a long period of time, for instance several months to about one year, to concentrate the lithium by several tenfold. Then, the impurities such as magnesium, calcium, boron were precipitated in order to be removed, and the method required an amount greater than the solubility of lithium carbonate to precipitate.

For instance, Chinese Patent Pub. No. 1,626,443 describes a method of extracting lithium, wherein brine is evaporated and concentrated under solar heat, and the concentrate is subject to repeated electro-dialysis in order to obtain brine containing concentrated lithium with a low amount of magnesium.

Such conventional methods require the evaporation and concentration of the brine, which are consuming of energy and time, and unproductive, especially during rainy seasons. Further, the loss of lithium is unavoidable when lithium is precipitated along with other impurities in the form of a salt.

DISCLOSURE OF INVENTION

Technical Problem

In accordance with an embodiment of the present invention, provided is a method of economical extraction of high purity lithium phosphate with high extraction yield from brine, which does not require the processes of evaporation and concentration of the brine for a long period of time, by using lithium phosphate which is dissolved in brine and has low solubility.

Solution to Problem

In accordance with an embodiment of the present invention, provided is a method of extracting lithium from a lithium bearing solution comprising the steps of: adding a nucleus particle to a lithium bearing solution; and precipitating the dissolved lithium in the lithium bearing solution as lithium phosphate by adding a phosphorous supplying material to the lithium bearing solution including the nucleus particle.

The nucleus particle may have a particle diameter of less than or equal to 100 μm.

The nucleus particle may have a particle diameter of less than or equal to 40 μm.

The nucleus particle may have a particle diameter of less than or equal to 25 μm.

The nucleus particle may have a particle diameter of less than or equal to 1 μm.

The nucleus particle may have a specific surface area ranging from 1 to 100 $m^2/g$.

The nucleus particle may have a specific surface area ranging from 50 to 100 $m^2/g$.

The nucleus particle may be a lithium compound.

The nucleus particle may be an insoluble lithium compound.

The nucleus particle may be at least one selected from an insoluble organic compound, and an insoluble inorganic compound.

The nucleus particle may be included in an amount of less than or equal to 0.05 g/L based on a total volume of the lithium bearing solution.

The nucleus particle may be at least one selected from $Li_3PO_4$, $Li_2CO_3$, and LiF.

The nucleus particle may be at least one selected from $Ca_3(PO_4)_2$, hydroxyapatite, zirconia, $TiO_2$, $SeO_2$, $Mg_3(PO_4)_2$, MgO, $MgAl_2O_4$, $Al_2O_3$, and a plastic particle.

The phosphorous supplying material may be at least one selected from phosphorous, phosphoric acid, a phosphate, and a mixture thereof.

A concentration of the lithium phosphate may be at least 0.39 g/L.

The lithium bearing solution may be brine.

A lithium concentration in the lithium bearing solution is greater than or equal to 0.1 g/L.

The method may further comprise a step of extracting lithium phosphate by filtering the precipitated lithium phosphate from the lithium bearing solution.

Advantageous Effects of Invention

In accordance with an embodiment of the present invention, without the processes of evaporation and concentration of brine for a long period of time, lithium dissolved in the brine may be economically extracted as lithium with high extraction yield by precipitation using lithium phosphate having low solubility.

MODE FOR THE INVENTION

Cross-Reference to Related Application

This application claims priority to and the benefit of Korean Patent Application No. 10-2011-0132840 filed in the Korean Intellectual Property Office on Dec. 12, 2011, Korean Patent Application No. 10-2011-0144771 filed in the Korean Intellectual Property Office on Dec. 28, 2011, and Korean Patent Application No. 10-2011-0144772 filed in the Korean Intellectual Property Office on Dec. 28 2011, the entire contents of them are incorporated herein by reference.

The features of one embodiment of the present invention will be described in more detail with reference to the figures as follows.

In accordance with an embodiment of the present invention, a method of economical and efficient extraction of lithium from a lithium bearing solution by adding a phosphorous supplying material to the solution to precipitate lithium phosphate instead of lithium carbonate from the dissolved lithium is provided.

Due to its solubility being approximately 13 g/L, a relatively large amount of lithium carbonate ($Li_2CO_3$) may be dissolved in the water. It is difficult to extract lithium from a lithium bearing solution, such as brine, because an extremely small concentration of lithium of 0.5 g/L to 1.5 g/L is dissolved. Even if lithium carbonate is produced by adding sodium carbonate to the lithium bearing solution, most of it re-dissolves.

The solubility of lithium phosphate ($Li_3PO_4$), however, is approximately 0.39 g/L, which is relatively lower than that of lithium carbonate. Accordingly, it is possible to extract even a small concentration of about 0.5 g/L to about 1.5 g/L (about 2.75 g/L to about 16.5 g/L when being converted into lithium phosphate) of lithium dissolved in the lithium bearing solution, such as brine, which can be precipitated and separated into lithium phosphate in a solid state by adding a phosphorous supplying material in the lithium bearing solution.

The lithium bearing solution may have a lithium concentration of about 0.1 g/L or more.

More specifically, the concentration may be about 0.2 g/L or more, or about 0.5 g/L or more.

The concentration of about 60 g/L or more, however, may not be economical because a great amount of cost is required for the high-enrichment of lithium.

The phosphorous supplying material selected from the group consisting of phosphorous, phosphoric acid, phosphate, and a mixture thereof is added to the lithium bearing solution to produce lithium phosphate.

In addition, in order for the lithium phosphate to be precipitated in a solid state without being re-dissolved, the concentration should be about 0.39 g/L or greater.

The phosphate may be, for example, but is not limited thereto, potassium phosphate, sodium phosphate, and ammonium phosphate. Specifically, the ammonium may be $(NR_4)_3PO_4$, wherein R is independently a hydrogen, a heavy hydrogen, a substituted or unsubstituted C1 to C10 alkyl group, but not limited thereto.

More specifically, the phosphate may be, for example, but is not limited thereto, mono-potassium phosphate, di-potassium phosphate, tri-potassium phosphate, mono-sodium phosphate, di-sodium phosphate, tri-sodium phosphate, aluminum phosphate, zinc phosphate, poly-ammonium phosphate, sodium-hexa-meta-phosphate, mono-calcium phosphate, di-calcium phosphate, and tri-calcium-phosphate.

The phosphorous supplying material may be water-soluble.

In case the phosphorous supplying material is water-soluble, its reaction with lithium contained in the lithium bearing solution may easily occur.

The precipitated lithium phosphate may be extracted by filtering the lithium bearing solution.

According to one embodiment of the present invention, provided is a method of economically extracting lithium from a lithium bearing solution comprising the steps of: adding a nucleus particle to a lithium bearing solution; and precipitating the dissolved lithium in the lithium bearing solution as lithium phosphate by adding a phosphorous supplying material to the lithium bearing solution including the nucleus particle.

The nucleus particle may be a homogeneous nucleus particle.

Alternatively, the nucleus particle may be a non-homogeneous nucleus particle.

The shape of the nucleus particle is not limited to a particular kind.

The nucleus particle may have a particle diameter of less than or equal to about 100 μm.

Specifically, the nucleus particle may have a particle diameter of less than or equal to about 40 μm, less than or equal to about 25 μm, less than or equal to about 6 μm, or less than or equal to about 1 μm.

The particle diameter may be an average particle diameter.

In addition, although the smaller particle diameter may lead to higher lithium phosphate extraction efficiency, the particle diameter range of the present invention is not limited to aforementioned ranges.

In addition, the nucleus particle may be insoluble in the lithium bearing solution.

The presence of the nucleus particle may efficiently promote the precipitation of lithium phosphate from the lithium bearing solution, one of the reasons being that the nucleus particle may lower the activation energy required for precipitating the lithium phosphate within the lithium bearing solution.

The nucleus particle may be a lithium compound.

However, the nucleus particle is not limited to any particular kind.

For example, the nucleus particle may be, but is not limited to, a metal particle, an inorganic compound particle, an organic compound particle, and the like.

Specifically, the nucleus particle may be an insoluble lithium compound.

More specifically, the nucleus particle may be at least one selected from an insoluble inorganic compound, and an insoluble organic compound.

For example, the nucleus particle may be at least one selected from $Li_3PO_4$, $Li_2CO_3$, and LiF.

For another example, the nucleus particle may be at least one selected from MgO, $MgAl_2O_4$, $Al_2O_3$, and a plastic particle.

For still another example, the nucleus particle may be at least one selected from $Ca_3(PO_4)_2$, hydroxyapatite, zirconia, $TiO_2$, $SeO_2$, $Mg_3(PO_4)_2$, and the like.

More specifically, the plastic particle may be a TEFLON (tetrafluoroethylene) particle, a PVD particle, a urethane particle, and the like.

However, the present invention is not limited to the aforementioned examples.

Since the nucleus particle may remain as a part of impurities during the precipitation of lithium phosphate, it is desirable to use the lithium phosphate itself as a nucleus particle.

The nucleus particle may be included in the lithium bearing solution in the amount of less than or equal to about 20 g/L, less than or equal to about 10 g/L, less than or equal to about 5 g/L, less than or equal to about 2 g/L, less than or equal to about 1 g/L, less than or equal to about 0.5 g/L, less than or equal to about 0.1 g/L, or less than or equal to about 0.05 g/L based on the total volume of the lithium bearing solution.

The nucleus particle may have a specific surface area ranging from about 1 to about 100 m²/g.

When the nucleus particle has a specific surface area within the range, lithium may be effectively extracted.

Specifically, the nucleus particle may have a specific surface area ranging from about 50 to about 100 m²/g.

The method of economical and efficient extraction of lithium from a lithium bearing solution by adding a phosphorous supplying material to the solution to precipitate lithium phosphate from the dissolved lithium may be performed at room temperature or above. More specifically, the step may be performed at 20° C. or above, 30° C. or above, 50° C. or above, or 90° C. or above.

In the present invention, the term "room temperature" is not limited to a definite temperature, and it is construed to mean a temperature without the application of external energy. Accordingly, the room temperature may vary depending on time and place.

In addition, the lithium bearing solution may be brine.

The present invention is further illustrated by the following examples, although the following examples relate to preferred embodiments and are not to be construed as limiting on the scope of the invention.

Comparative Example 1

7.217 g/L of sodium phosphate was added to a lithium bearing solution including 0.917 g/L of lithium ions, and subsequently heating up the temperature to 90° C., the mixture was allowed to react for 15 to 60 minutes, while maintaining its temperature.

When the reaction was completed, the reactant was filtered to separate lithium phosphate precipitated therein, and the lithium concentration of the filtrate was subsequently measured.

Example 1: Use of Lithium Phosphate as Nucleus Particle

A small amount (2 g/L) of lithium phosphate as a nucleus particle was added to a lithium bearing solution including lithium ions in a concentration of 0.917 g/L, and then sodium phosphate in a concentration of 7.217 g/L was added thereto.

Subsequently heating up the temperature to 90° C., the mixture was allowed to react for 15 to 60 minutes, while maintaining its temperature.

When the reaction was completed, the reactant was filtered to separate lithium phosphate precipitated therein, and the lithium concentration of the filtrate was subsequently measured.

The lithium phosphate used as a nucleus particle had an average particle diameter of 6 µm.

Figure 1:
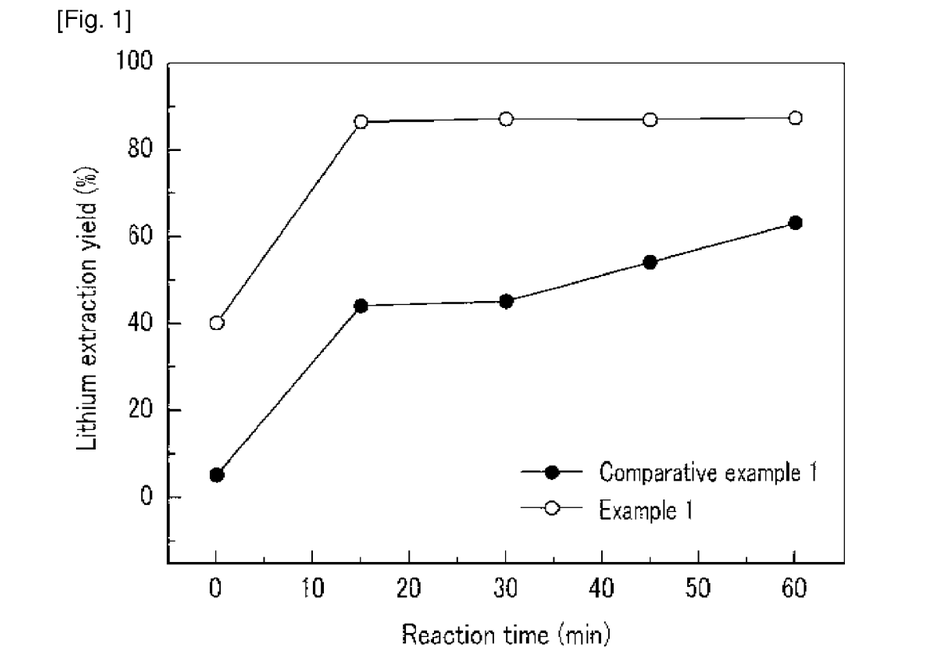
FIG. 1 is a graph showing lithium yield rates of Example 1 including a nucleus particle and Comparative Example 1 in absence of nucleus particle.

FIG. 1 is a graph showing lithium yield rates of Example 1 including a nucleus particle and Comparative Example 1 in absence of nucleus particle.

As shown in FIG. 1, when a small amount (e.g., 2 g) of lithium phosphate as a nucleus particle (e.g., a homogeneous nucleus particle) was added to a lithium bearing solution before sodium phosphate was added thereto, the concentration of the filtrate dramatically decreased. After 15 minutes of reaction, the lithium concentration of the filtrate decreased to 119 mg/L and then was maintained, which shows about 87% of lithium dissolved in brine was precipitated and separated into lithium phosphate.

Accordingly, a lithium precipitation rate may be improved by using lithium phosphate as a homogeneous nucleus or other insoluble lithium compounds.

Example 2: Use of MgO as Nucleus Particle

Lithium phosphate was extracted according to the same method as described in Example 1 except for using MgO instead of the lithium phosphate as a nucleus particle in Example 1.

The MgO nucleus particle had an average particle diameter of 6 µm.

Figure 2:
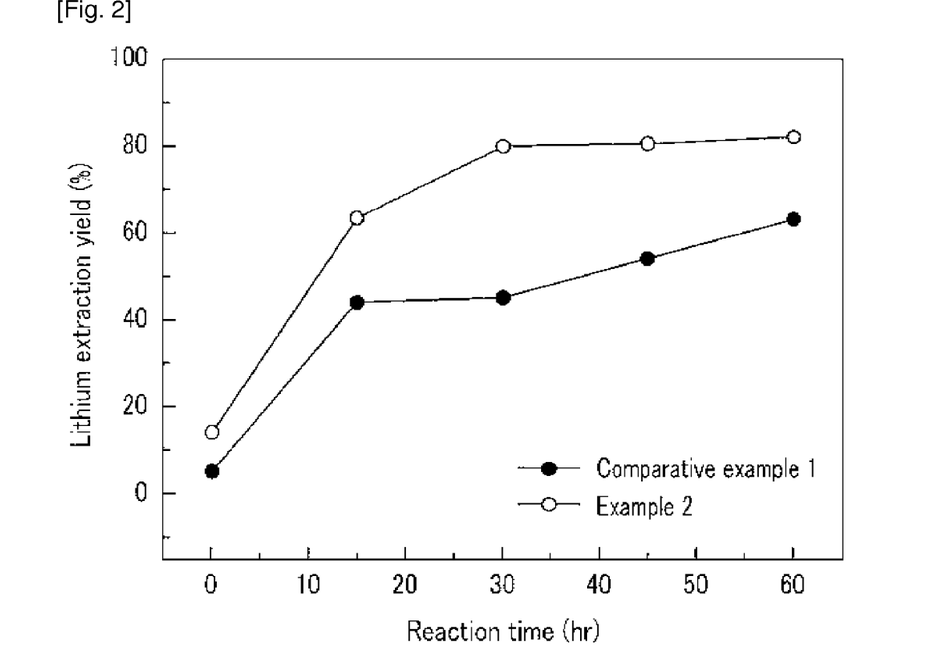
FIG. 2 shows experimental data according to Example 2 and Comparative Example 1.

FIG. 2 shows experimental data according to Example 2.

As shown in FIG. 2, when a small amount (e.g., 2 g) of MgO as a nucleus particle (e.g., a non-homogeneous nucleus particle) was added to a lithium bearing solution before sodium phosphate was added thereto, the concentration of the filtrate dramatically decreased. After 30 minutes of reaction, the lithium concentration of the filtrate decreased to 185 mg/L and then was maintained, which shows about 80% of lithium dissolved in brine was precipitated and separated into lithium phosphate.

Example 3: Use of MgAl$_2$O$_4$ as Nucleus Particle

Lithium phosphate was extracted according to the same method as described in Example 1 except for using MgAl$_2$O$_4$ instead of lithium phosphate as a nucleus particle in Example 1.

The MgAl$_2$O$_4$ nucleus particle had an average particle diameter of 6 μm.

Figure 3:
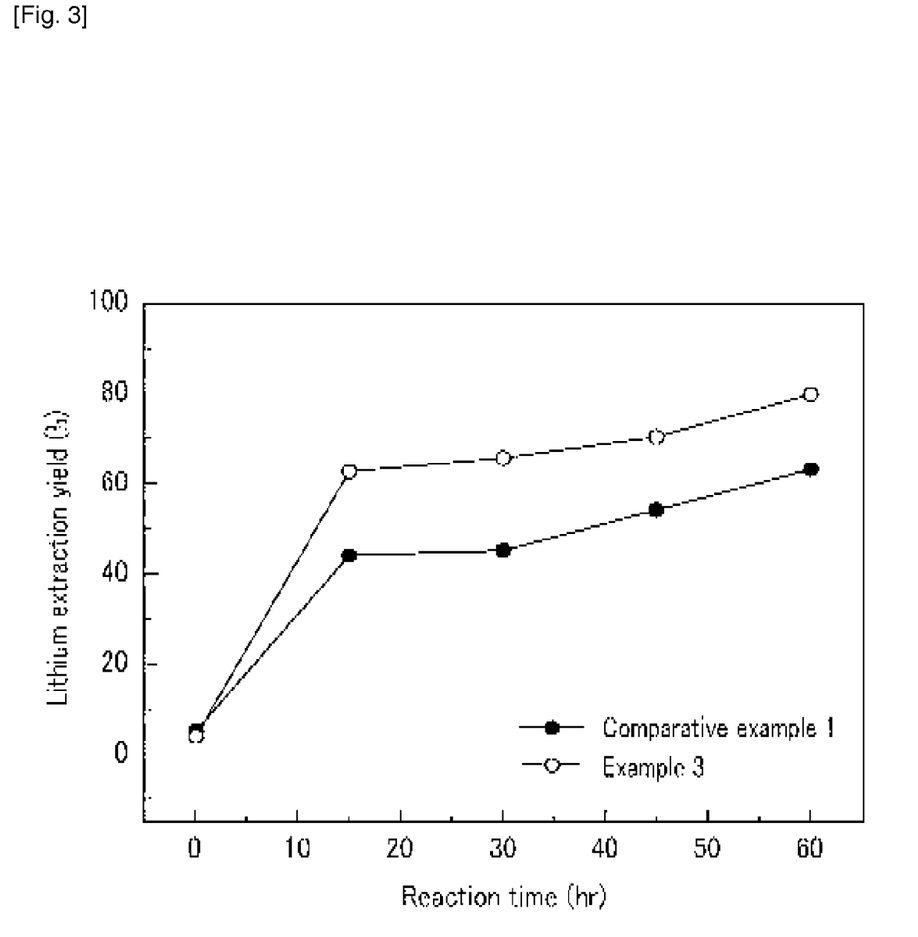
FIG. 3 shows experimental data according to Example 3 and Comparative Example 1.

FIG. 3 shows experimental data according to Example 3.

As shown in FIG. 3, when a small amount (e.g., 2 g) of MgAl$_2$O$_4$ as a nucleus particle (e.g., a non-homogeneous nucleus particle) was added to a lithium bearing solution before sodium phosphate was added thereto, the concentration of the filtrate decreased. After one hour of reaction, the lithium concentration of the filtrate decreased to 187 mg/L, which shows about 79.6% of lithium dissolved in brine was precipitated and separated into lithium phosphate.

Example 4: Use of Al$_2$O$_3$ as Nucleus Particle

Lithium phosphate was extracted according to the same method as described in Example 1 except for using Al$_2$O$_3$ instead of lithium phosphate as a nucleus particle in Example 1.

The Al$_2$O$_3$ nucleus particle had an average particle diameter of 6 μm.

Figure 4:
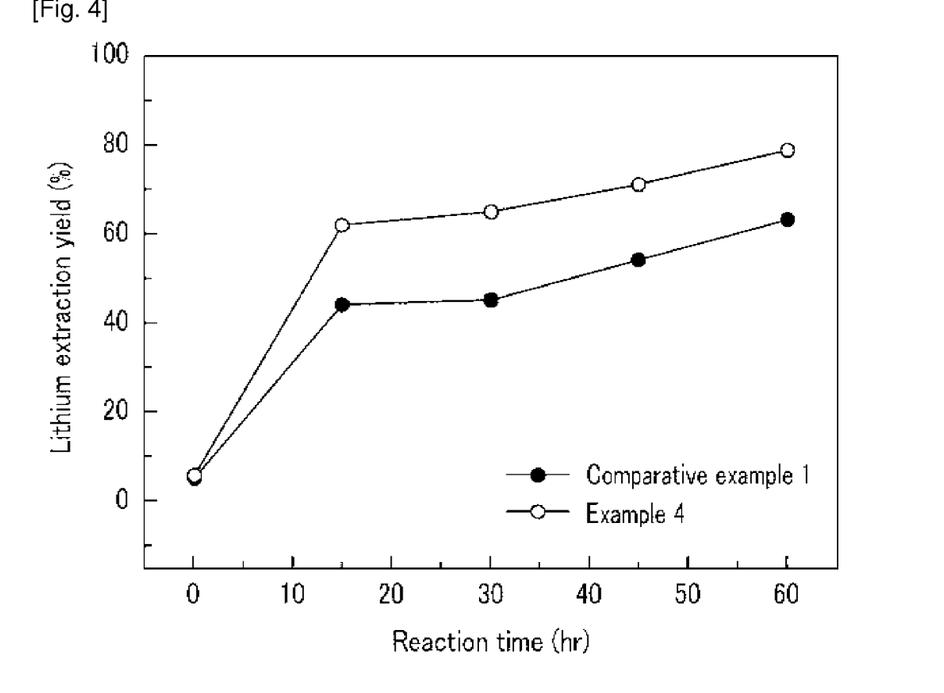
FIG. 4 shows experimental data according to Example 4 and Comparative Example 1.

FIG. 4 shows experimental data according to Example 4.

As shown in FIG. 4, when a small amount (e.g., 2 g) of Al$_2$O$_3$ as a nucleus particle (e.g., a non-homogeneous nucleus particle) was added to a lithium bearing solution before sodium phosphate was added thereto, the concentration of the filtrate decreased. After one hour of reaction, the lithium concentration of the filtrate decreased to 193 mg/L, which shows about 78.8% of lithium dissolved in brine was precipitated and separated into lithium phosphate.

Example 5: Use of Teflon Tube as Nucleus Particle

Lithium phosphate was extracted according to the same method as described in Example 1 except for using a Teflon tube instead of the lithium phosphate nucleus particle in Example 1.

The Teflon tube nucleus particle had an average interior diameter of 6400 μm.

Figure 5:
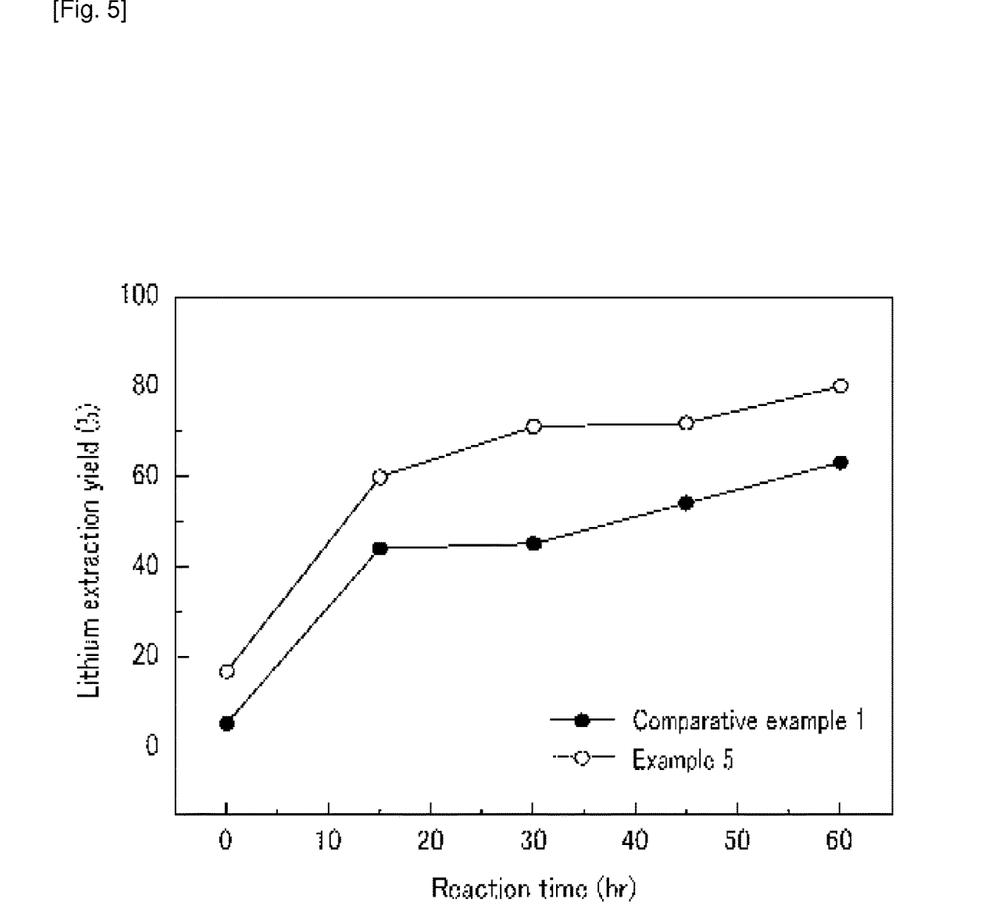
FIG. 5 shows experimental according to Example 5 and Comparative Example 1.

FIG. 5 shows experimental data according to Example 5.

As shown in FIG. 5, when a small amount (e.g., 2 g) of Teflon tube as a nucleus particle (e.g., a non-homogeneous nucleus particle) was added to a lithium bearing solution before sodium phosphate was added thereto, the concentration of the filtrate decreased as the reaction time increased. After one hour of reaction, the lithium concentration of the filtrate decreased to 182 mg/L, which shows about 80.1% of lithium dissolved in brine was precipitated and separated into lithium phosphate.

Example 6: Use of Nucleus Particle Having Various Different Particle Diameters Artificial brine having a similar composition to natural brine was prepared using chloride of each element as provided in the following Table 1.

TABLE 1

| unit (g/L) | Li | Na | K |
|---|---|---|---|
| lithium bearing solution | 0.965 | 122.0 | 45.7 |

Each of various 2 g/L of lithium phosphate nucleus particles, each having a different average particle diameter, was added to a lithium bearing solution including lithium ions in a concentration of 0.951 g/L, and then sodium phosphate in a concentration of 7.217 g/L was added thereto.

When the reaction at room temperature was completed, the reactant was filtered to separate lithium phosphate precipitated therein, and the lithium concentration of the filtrate was subsequently measured.

Each of the nucleus particles added had an average particle diameter of 13.640 μm, 25.234 μm, and 37.415 μm, respectively.

Figure 6:
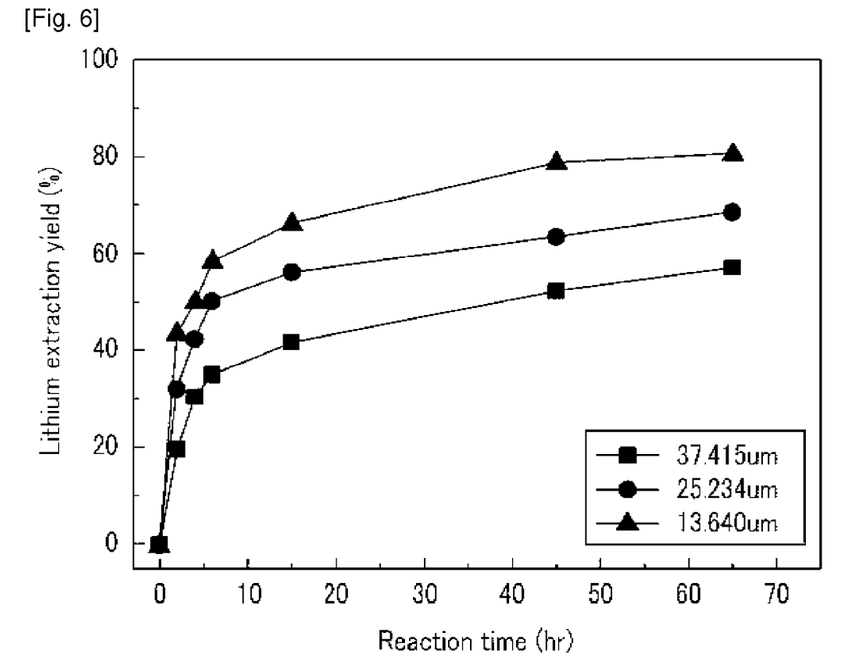
FIG. 6 is a graph showing lithium concentration changes according to Example 6 using various nucleus particles, each having a different particle diameter.

FIG. 6 is a graph showing lithium concentration changes according to Example using various nucleus particles, each having a different particle diameter.

As shown in FIG. 6, when each of various 2 g/L of lithium phosphate nucleus particles, each having a different average particle diameter was added to a lithium bearing solution before sodium phosphate was added thereto, the lithium concentration of the filtrate all decreased. After 65 hours of reaction, the filtrate concentration dropped to 0.179 g/L when a nucleus particle had an average particle diameter of 13.640 μm, 0.302 g/L when a nucleus particle had an average particle diameter of 25.234 μm, and 0.412 g/L when a nucleus particle had an average particle diameter of 37.415 μm.

In other words, the lithium extraction yield was 81.4%, 68.7%, and 57.3% when a nucleus particle had an average particle diameter of 13.640 μm, 25.234 μm, and 37.415 μm, respectively.

Accordingly, the addition of lithium phosphate as a nucleus particle with a smaller particle diameter results in a significantly improved lithium precipitation rate.

Example 7: Use of Nucleus Particles Having Various Different Specific Surface Areas Artificial brine having a similar composition to natural brine was prepared using chloride of each element as provided in the following Table 2.

TABLE 2

| unit (g/L) | Li | Na | K |
|---|---|---|---|
| lithium bearing solution | 0.981 | 120.0 | 43.2 |

Each of various 2 g/L of lithium phosphate nucleus particles, each having a different specific surface area, was added to a lithium bearing solution including lithium ions in a concentration of 0.981 g/L, and then sodium phosphate in a concentration of 7.220 g/L was added thereto.

When the reaction at room temperature was completed, the reactant was filtered to separate lithium phosphate precipitated therein, and the lithium concentration of the filtrate was subsequently measured.

Figure 7:
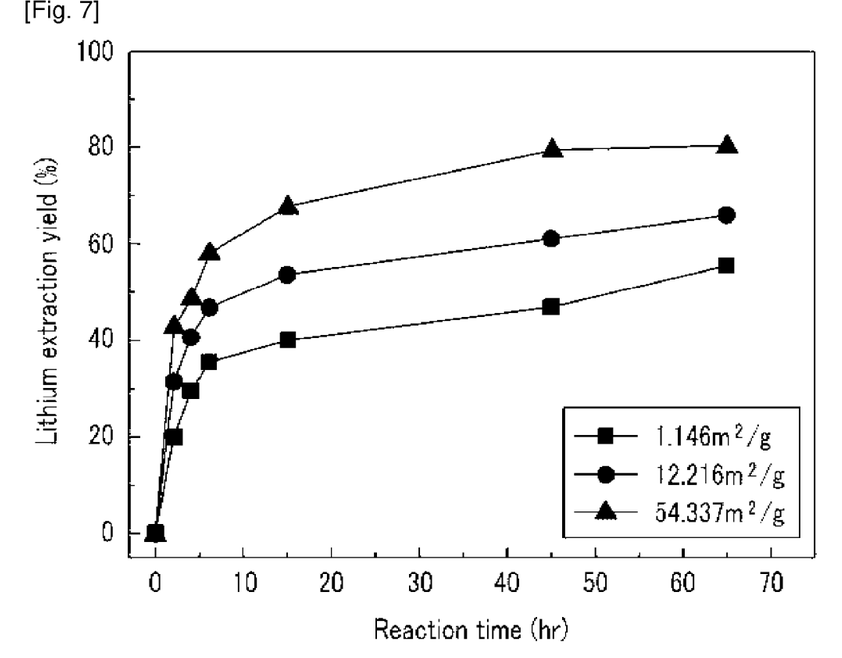
FIG. 7 is a graph showing lithium yield rate changes according to Example 7 using various nucleus particles, each having a different specific surface area.

FIG. 7 is a graph showing lithium yield rate changes according to Example 7 using various nucleus particles, each having a different specific surface area.

As shown in FIG. 7, when each of various 2 g/L of lithium phosphate nucleus particles, each having a different specific surface area was added to a lithium bearing solution before sodium phosphate was added thereto, the lithium concentration of the filtrate all decreased relative to the elapse of reaction time. After 65 hours of reaction, each of the filtrate concentrations dropped to 435 mg/L, 332.3 mg/L, and 192.1 mg/L when each nucleus particle had a specific surface area of 1.146 m$^2$/g, 12.216 m$^2$/g, and 54.337 m$^2$/g, respectively.

In other words, the lithium extraction rates all increased. Specifically, the lithium extraction rates increased to 55.6%, 66.1%, and 80.4% when each nucleus particle had a specific surface area of 1.146 m$^2$/g, 12.216 m$^2$/g, and 54.337 m$^2$/g, respectively.

Accordingly, the addition of lithium phosphate as a nucleus particle with a greater specific surface area results in a significantly improved lithium precipitation rate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of extracting lithium from a lithium bearing solution comprising the steps of:
   adding a nucleus particle to a lithium bearing solution; and
   precipitating dissolved lithium in the lithium bearing solution as lithium phosphate by adding a phosphorous supplying material to the lithium bearing solution including the nucleus particle,
   wherein the nucleus particle has a particle diameter ranging from 6 to 25 μm and a specific surface area ranging from 50 to 100 m$^2$/g.

2. The method of claim 1, wherein the nucleus particle is a lithium compound.

3. The method of claim 1, wherein the nucleus particle is an insoluble lithium compound.

4. The method of claim 1, wherein the nucleus particle is at least one selected from an insoluble organic compound, and an insoluble inorganic compound.

5. The method of claim 1, wherein the nucleus particle is included in an amount of less than or equal to 0.05 g/L based on a total volume of the lithium bearing solution.

6. The method of claim 1, wherein the nucleus particle is at least one selected from $Li_3PO_4$, $Li_2CO_3$, and LiF.

7. The method of claim 1, wherein the nucleus particle is at least one selected from $Ca_3(PO_4)_2$, hydroxyapatite, zirconia, $TiO_2$, $SeO_2$, $Mg_3(PO_4)_2$, MgO, $MgAl_2O_4$, $Al_2O_3$, and a plastic particle.

8. The method of claim 1, wherein the phosphorous supplying material is at least one selected from phosphorous, phosphoric acid, a phosphate, and a mixture thereof.

9. The method of claim 1, wherein a concentration of the lithium phosphate is at least 0.39 g/L.

10. The method of claim 1, wherein the lithium bearing solution is brine.

11. The method of claim 1, wherein a lithium concentration in the lithium bearing solution is greater than or equal to 0.1 g/L.

12. The method of claim 1, further comprising a step of extracting lithium phosphate by filtering the precipitated lithium phosphate from the lithium bearing solution.

* * * * *